United States Patent Office 3,000,974
Patented Sept. 19, 1961

3,000,974
CHLORINATED DERIVATIVES OF DIELS-ALDER ADDUCT OF PENTACHLOROPENTADIENE AND CYCLOPENTADIENE
Morton Kleiman and Arthur Goldman, Chicago, Ill., assignors to Velsicol Chemical Corporation, Chicago, Ill., a corporation of Illinois
No Drawing. Filed Nov. 24, 1958, Ser. No. 775,701
4 Claims. (Cl. 260—648)

This invention relates to the production of new insecticidal compositions of matter and is a continuation-in-part of our copending application Serial No. 535,534, filed September 20, 1955 now abandoned, which in turn is a continuation of our application Serial No. 282,261, filed April 14, 1952, now abandoned, which was copending therewith.

More specifically, this invention relates to the Diels-Alder adduct of pentachlorocyclopentadiene and cyclopentadiene and to the chlorinated derivatives of this adduct.

Since about 1943, when the chlorinated insecticide DDT was imported to the United States, great interest and research have been devoted to the development of other potent, residual, chlorinated insecticides. This research has resulted in the production of various residual, chlorinated insecticides which give excellent protection against insect infestation for protracted periods. With the development of insecticides having greater toxicity to insects and increased residual characteristics, the problem of food contamination when residual insecticides are applied to growing crops arises. It is, therefore, extremely desirable to develop insecticides which will exhibit residual characteristics but which, at the same time, will volatilize so that none will remain at the time of harvest.

One object of the present invention is the production of new and useful insecticides.

Another object is the manufacture of an insecticide which has a controlled residual toxicity.

Another object of the present invention is the manufacture of an insecticidal material which has sufficient volatility to exert a fumigant action while retaining residual toxicity.

Another object of this invention is the production of insecticidal material with a vapor pressure which is sufficiently high to insure evaporation of residues from food crops.

These and other objects of this invention will be apparent from a consideration of the following specification and appended claims.

The products of the present invention are the Diels-Alder adduct of pentachlorocyclopentadiene and cyclopentadiene having from 0 to 3 more chlorine atoms attached to the carbon atoms of said adduct in positions 1 to 3, with no one carbon atom in positions 1 to 3 having more than one chlorine atom. It is pointed out that these additional chlorine atoms are attached to carbon atoms of the adduct in the positions 1, 2 and 3 and that the number 8 carbon atom (the monochloro endomethylene group) remains unsubsttiuted by the reaction.

The Diels-Alder reaction of pentachlorocyclopentadiene and cyclopentadiene is exemplified by the following equation:

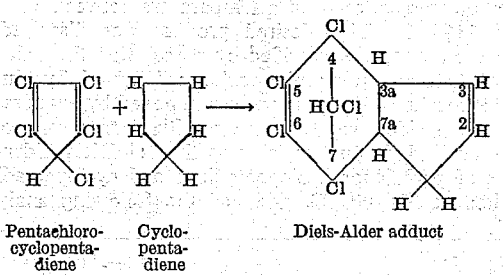

Pentachloro-   Cyclo-       Diels-Alder adduct
cyclopenta-   penta-
diene         diene For convenience, the 1:1 addition product of penachlorocyclopentadiene and cyclopentadiene will hereafter be referred to as DAA.

Pentachlorocyclopentadiene which is the starting material in the preparation of the products of the present invention is prepared by chlorinating cyclopentadiene with aqueous, alkaline, alkali metal hypochlorite solution. Alkali metal hypochlorites such as sodium, lithium or potassium hypochlorite are satisfactory. For convenience, a specific example of the preparation of pentachlorocyclopentadiene is presented herewith as Example I.

EXAMPLE I

Into a 3-liter, 3-necked flask equipped with an efficient stirrer, reflux condenser and thermometer were placed 2300 ml. aqueous, alkaline sodium hypochlorite solution (1.262 M, OCl⁻; 0.248 M, OH⁻; the alkaline reagent utilized was sodium hydroxide), and 33 g. freshly prepared cyclopentadiene. The contents of the flask were mixed and simultaneously cooled so as to maintain an internal temperature of about 25° C. Samples were periodically removed and analyzed for hypochlorite concentration by titrating a known volume of the aqueous phase iodometrically. The stirring was continued until the analysis remained constant showing no further reaction taking place. The reaction is substantially complete after about twenty minutes. At the end of this time stirring was discontinued and the layers of organic and inorganic material were separated. The organic fraction was dried with anhydrous $MgSO_4$ and filtered. Pentachlorocyclopentadiene was isolated in a pure state from the organic product by vacuum fractional distillation at 0.7 mm. of mercury pressure. Pentachlorocyclopentadiene was collected as distillate at overhead temperatures between 45.6° C. and 46.3° C. This product had the following analysis:

| | C, percent | H, percent | Cl, percent |
|---|---|---|---|
| Analysis of Product | 25.06 | 0.42 | 74.33 |
| Calculated for $C_5HCl_5$ | 25.19 | 0.43 | 74.38 |

The 1:1 adduct of pentachlorocyclopentadiene and cyclopentadiene (DAA) is formed by reacting these two components preferably in equal molar ratios and either in the presence or absence of a mutual solvent. A process specifically illustrating the formation of DAA is shown in Example II.

EXAMPLE II

Pentachlorocyclopentadiene (119 g.; 0.5 mole) was placed in a 3-necked flask equipped with a stirrer, thermometer and reflux condenser. While maintaining the temperature of the pentachlorocyclopentadiene at a temperature of 65–70° C., cyclopentadiene was added slowly over a period of about one hour. The reaction mixture was continuously stirred during this addition of cyclopentadiene. After addition was complete the reaction mixture was heated with stirring at 70° for an additional four hours. The product was purified by fractional distillation at 0.3 mm. of mercury and the desired fraction was collected at a temperature between 110° C. and 116° C. This desired product was dissolved in pentane and further purified by percolation through and adsorption on an alumina column followed by elution with pentane. The pentane was removed by evaporation and the residue was twice recrystallized from methanol. The purified product which was the 1:1 Diels-Alder adduct of pentachlorocyclopentadiene and cyclopentadiene melted at 97–100° C. and had the following analysis:

| | C, percent | H, percent | Cl, percent |
|---|---|---|---|
| Analysis of purified product | 39.49 | 2.32 | 58.31 |
| Calculated for $C_{10}H_7Cl_5$ | 39.45 | 2.32 | 58.23 |

DAA appears to be somewhat unstable at normal room temperature or more elevated temperatures. This material should therefore be stored at temperatures of about 0° C. or lower when long periods of storage are contemplated.

DAA has insecticidal properties and may be used with effectiveness. However, it has been discovered that by further chlorinating this somewhat unstable adduct, products are obtained which are of greatly enhanced value. Further chlorination unexpectedly stabilizes the product, so that it can be stored for protracted periods at ordinary temperatures. Also, further chlorination, as hereinafter described, increases the insecticidal activity of DAA many times. Such further chlorination adds greater value in that it achieves a balanced residual effectiveness to insure protection of crops for the time required, coupled with a removal of any toxic residues at the time of harvest.

The beneficial effects obtained by chlorination of DAA can be accomplished by addition chlorination or substitution chlorination, or a combination of both so that DAA contains 1 to 3 more chlorine atoms positioned at carbon atoms 1 to 3 of DAA with none of said carbon atoms having more than one chlorine atom attached thereto and with none of the added chlorine atoms being positioned at the number 8 carbon atom.

Specifically, the beneficial effects observed by chlorinating DAA may be accomplished by adding two chlorine atoms across the double bond in the unsubstituted cyclopentene ring of DAA (carbon atoms numbered 2 and 3) or by substituting a chlorine atom in the 1 position of DAA or by a combination of both.

The following examples specifically illustrate the preparation of these products.

EXAMPLE III

To a stirred solution of DAA (33 g.) in $SO_2Cl_2$ (80 ml.) and $S_2Cl_2$ (0.21 ml.) maintained at a temperature of 40–50° C. was added in a dropwise manner a solution of $AlCl_3$ (0.33 g.) in $SO_2Cl_2$ (5 ml.). A vigorous reaction took place and when it had subsided the reaction mixture was heated at reflux for 10 minutes. Unreacted $SO_2Cl_2$ and other volatiles were removed by vacuum distillation. The residue from the distillation was extracted with isopropyl ether and the resulting solution was washed with water and aqueous sodium bicarbonate solution. The solvent was removed by evaporation and the residue was further purified by trituration with cold methanol. The purified product, which was DAA-dichloride, melted, after drying, at 85–88° C. An elemental analysis gave the following results:

| | C, percent | H, percent | Cl, percent |
|---|---|---|---|
| Analysis of purified product | 31.72 | 1.86 | 65.99 |
| Calculated for $C_{10}H_7Cl_7$ | 31.99 | 1.88 | 66.12 |

The reaction of Example III may be illustrated by the following equation:

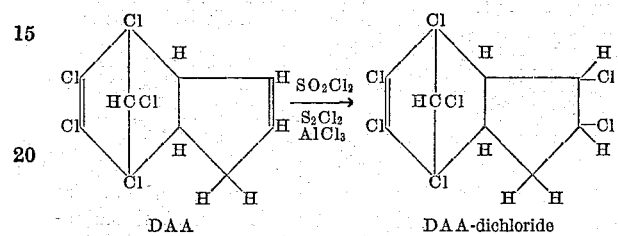

EXAMPLE IV

A. Preparation of 1-hydroxy-DAA

A mixture of DAA (35.1 g.; 0.115 mole), $SeO_2$ (6.7 g.; 0.06 mole), pure dioxane (60 ml.) and water (1.5 ml.) was heated under reflux for 26 hours. Precipitated selenium, which weighed 3.54 g. after drying, was collected by filtration. The filtrate was concentrated in vacuo, and the residue was extracted with isopropyl ether. The extract solution was washed several times with water and sodium bicarbonate solution and then dried over anhydrous $MgSO_4$. Evaporation of the ether resulted in an oil residue (34.0 g.). This residue was purified by trituration with pentane followed by recrystallization from heptane. The colorless crystals resulting from this purification process melted at 131–132.5° C. An elemental analysis of this product was as follows:

| | C, percent | H, percent | Cl, percent |
|---|---|---|---|
| Analysis of purified product | 37.65 | 2.10 | 54.91 |
| Calculated for $C_{10}H_7OCl_5$ | 37.48 | 2.20 | 55.32 |

B. Conversion of 1-hydroxy-DAA to 1-chloro-DAA

To 1-hydroxy-DAA (19 g.) in a reaction vessel equipped with a stirrer and reflux condenser was added $SOCl_2$ (20 ml.). A vigorous evolution of gas accompanied by heat of reaction was observed. When visual evidence of reaction had subsided the reaction mixture was refluxed for three hours. Excess $SOCl_2$ was evaporated under vacuum. The residue was dissolved in ether, washed with water and sodium bicarbonate solution and then dried over anhydrous $MgSO_4$. The ether solvent was removed by evaporation and the residue was dissolved in pentane and further purified by percolation through and adsorption on an alumina column, followed by elution with pentane. The pentane was then removed by evaporation and the oily residue was further purified by fractional distillation at a pressure of 0.25–0.3 mm. of mercury. The desired fraction was collected at an overhead temperature of 102° C. to 104° C. This purified material had a refractive index of 1.5728 at 25° C. and the following analysis:

| | C, percent | H, percent | Cl, percent |
|---|---|---|---|
| Analysis of purified product | 35.44 | 1.74 | 62.93 |
| Calculated for $C_{10}H_6Cl_6$ | 35.43 | 1.79 | 62.77 |

The product thus prepared in Example IV has the structure:

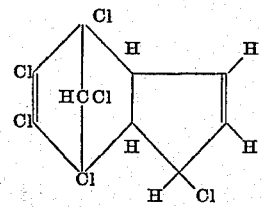

It is evident from Examples III and IV that chlorination of DAA by addition or substitution in positions 1 to 3 are not necessarily mutually exclusive. For example, one may readily chlorinate all three available positions in the unsubstituted cyclopentene ring of DAA by first chlorinating DAA in accordance with Example IV and then further chlorinating the resulting 1-chloro-DAA in accordance with Example III (allowing only for the known stoichiometric difference between DAA and 1-chloro-DAA) to produce DAA having three more chlorine atoms, as shown in the following structure:

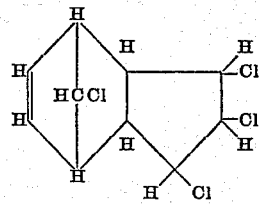

Chlorination of DAA to introduce from 1 to 3 more chlorine atoms on the number 1, 2, and 3 carbon atoms can also be effected by the use of chlorine as the chlorinating agent. One may use pressure, catalysts, or simply bubble chlorine through a solution of DAA in a relatively inert solvent.

The chlorination reactions of the present invention are not dependent on the presence or absence of light. Thus, the products claimed can be prepared in opaque apparatus, or, as in the case of the specific examples herein presented, in transparent glass apparatus subjected to normal illumination sufficient for normal and efficient vision.

These chlorinated derivatives are considerably more stable than DAA, and show no sign of degradation after storage. They have excellent insecticidal properties as is shown by the fact that a one microgram dosage of 1-chloro-DAA and a two microgram dosage of DAA-dichloride were sufficient to respectively cause a 40–45% mortality of female German roaches in a 48-hour period. To secure comparable kills with DAA, 17 micrograms were required.

The products of the present invention may be formulated and applied in a like manner as are other chlorinated insecticides. Exemplary of such formulations and applications are dusts, wettable powders, dispersions, oil sprays, aerosols, and fogs.

The present products are soluble in most organic solvents, such as petroleum solvents, naphthas, kerosenes, benzene, chlorinated hydrocarbons, ethers, ketones, esters, alcohols, etc., and are therefore eminently suited for general application in various formulations.

We claim:
1. As a new composition of matter a compound of the formula:

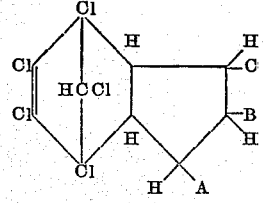

wherein at least one of the substituents A, B, and C is chlorine and the remainder are selected from the group consisting of hydrogen and chlorine and wherein B and C constitute a carbon-to-carbon bond when A alone is chlorine.

2. As a new composition of matter a compound of the formula:

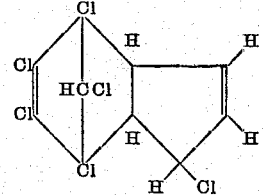

3. As a new composition of matter a compound of the formula:

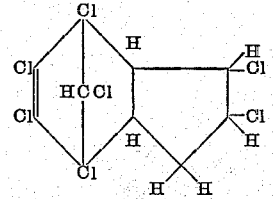

4. As a new composition of matter a compound of the formula:

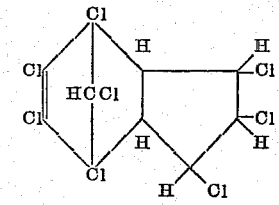

References Cited in the file of this patent
UNITED STATES PATENTS
2,519,190    Hyman _____ Aug. 15, 1950